Patented July 12, 1938

2,123,605

UNITED STATES PATENT OFFICE 2,123,605

SYNTHETIC RESIN

John H. Kelly, Jr., Chicago, Ill.

No Drawing. Application March 25, 1935,
Serial No. 12,995

11 Claims. (Cl. 260—1)

This invention relates to synthetic resins of the polyhydric alcohol-aromatic polybasic acid class and to coating compositions incorporating the same.

The principal object of my invention is to obtain an improved form of synthetic resin adapted to form an improved finish when incorporated in coating compositions.

One of the features of this invention is the novel reaction complex, containing rubber in its composition which is subsequently treated with an aromatic polybasic acid and a polyhydric alcohol to obtain the finished resin. This reaction complex has decidedly different characteristics from those materials which heretofore have been combined with a polyhydric alcohol and an aromatic polybasic acid in the synthesis of resins of this class. The novel reaction complex is apparently a composition having definite constants when subjected to saponification tests, acid value and iodine determinations. Contrary to the general reaction of unsaturated oxidizable acids this novel reaction complex gives incomplete results with Wijs' solution and therefore Hanus' solution is taken as a method for determining its iodine value. The rubber, either unvulcanized or in its cured state, has lost its individual identity and becomes an integral component of the novel reaction mixture.

In the preferred form of my invention, the following procedure is used for the manufacture of the synthetic resin.

The reaction complex is prepared in a vessel equipped with agitator blades and provided with suitable devices for venting-off such fumes as may arise during the preparation. The following ingredients are placed in the vessel:

| | Parts by weight |
|---|---|
| Linseed oil acids | 320 |
| Tung oil | 140 |
| Rosin | 360 |
| Oleic acid | 90 |
| Rubber | 90 |
| | 1000 |

In this instance the rubber is preferably in the form of comminuted floating stock inner tubes, well washed and dried to remove dirt, road grit and other impurities. The fatty acids may be of ordinary commercial grade. Oleic acid, having the formula $C_nH_{2n-1}O_2$, is preferably used but any saturated monobasic fatty acid having boiling points over 200° C., and the formula $C_nH_{2n}O_2$, such as lauric, palmitic or stearic, may be used as they are extremely suitable plasticizers and softeners for rubber. The oleic series are preferred as the position of the double bonds renders them more reactive to the combined action of heat and oxidizing agents as they belong to the olefine-carboxylic class and are excellent softeners of rubber.

The materials in the vessel are heated to 310°–320° C. within 15 minutes. At 240°–250° C. violent frothing takes place and the reaction mass changes in color to a brown or tan colored mixture. As the temperature rises further, the reaction vessel becomes filled with frothy material. At 310°–320° C. a change is evident, streaks of orange color appear with water vapor given off to some extent. Heating is continued until a drop of the frothy material on glass indicates the desired body, whereupon the mass is drawn off and cooled to room temperature.

The resultant product is a very dark brown viscous mass possessing a characteristic pungent odor. It possesses little or no resemblance to the unsaturated oxidizable fatty acids commonly used in the synthesis of resins of this class. The following comparison may be made between the properties of the reaction complex and the corresponding values for linolenic acid:

| | Reaction complex | Linolenic acid |
|---|---|---|
| Specific gravity | 1.0192 | 201 |
| Saponification value | 126 | 201 |
| Acid value | 88 | 201 |
| Iodine No. (Hanus) | 59 | 173 |
| Bromide value | None | Full |

After having obtained the reaction complex as above described, the synthesis of the resin is continued in the following manner:

To 1000 parts of a warmed and liquefied mass of the reaction complex 700 parts of phthalic anhydrid are added and the temperature is raised to 185°–200° C. and agitated for 30 minutes. A molecular equivalent by weight of glycerol, 451 parts, is then added and after the temperature is lowered to 165° C. the mass is agitated for 10 minutes. The temperature is slowly raised to 220° C. during the course of 80 minutes, during which time vigorous agitation is carried out. The product is upon cooling a tough elastic mass, insoluble in gasoline and mineral spirits and very slowly soluble in toluol. At this stage of the process the reaction is considered to be complete and after reducing the temperature to 110° C. there is added 475 parts toluol, 25 parts highflash naphtha and 25 parts acetone, the agitation being continued until solution takes place.

The finished product is a tan colored opaque solution. It may be considered to contain a resinous complex of a phthalic anhydrid, glycerol and a reaction base having the chemical constant heretofore described.

The molecular proportions of the aromatic polybasic acid and the polyhydric alcohol are equivalent. Free hydroxyl groups, due to the excess of polyhydric alcohol over the dibasic acid, also exist.

If proportion of reaction complex is increased, it leads towards softer resins and increasing compatibility with oils of the drying type as well as mineral spirits.

When the synthetic resin as above described is incorporated in a lacquer and pigments, additional solvents, thinners and driers added, for example 1% lead and ½% cobalt, by metallic content, the films deposited by this composition dry into an insoluble state 12 to 24 hours after solvent evaporation. Metal panels having the coating composition applied thereto develop extraordinary hardness in the film after baking. Air drying films produce semi-flat surfaces but when rubbed down with standard rubbing compounds develop very high gloss. Both the air dried and baked films can be applied by spraying since up to 40% of resin solids can be incorporated into a suitable solvent or solvent combinations.

The reaction complex above described is in itself a novel composition of matter differing from other known products. The oxidizable unsaturated fatty acid is believed to undergo decomposition to some extent to 260° C., such decomposition progressively accelerating as temperature of reaction increases. During this process, the bromide number decreases and reaches a negligible value upon completion of the reaction. This evidently points to an internal molecular rearrangement in the structure of the fatty acid.

During the process of heating it is evident the reaction affects the position of the carboxyl groups in the unsaturated acid to some extent. It is well known that fatty acids undergo a change in molecular weight accompanied by a reduction in the acid number when subjected to extreme heat. On the other hand, prolonged heating decreases the molecular weight. Analysis of the fatty free acids by a saponification of the novel reaction complex indicates very strongly a decided change in the structure of the oxidizable unsaturated fatty acid.

The formula for the novel reaction base can be changed to vary the percentage of rubber, either cured or unvulcanized, but usually from 5 to 15% by weight of the polyhydric alcohol and the polybasic aromatic acid suffices. Rubber by my process can be successfully incorporated in amounts up to 25% by weight of the combined polyhydric alcohol-dibasic acid used.

In the formulas for the preferred embodiment of my invention as given above, the quantities of the reacting materials are specifically given but it should be understood that the invention is capable of certain modifications. For example, instead of using tung oil in the reaction complex, other drying oils may be used. Tung oil is preferred because of the fact that it has practically instantaneous dissolving action on rubber at elevated temperatures. Other natural or synthetic resins may be used in place of rosin, but such resins must have good solvent action on rubber. The saturated monobasic acid series $C_nH_{2n}O_2$ or the oleic series $C_nH_{2n-1}O_2$ are used to offset any possibility of incompatible rubber gells in the mixture. It will also be understood that other equivalent material may be used as substitutes for the other ingredients in the formula and that the proportions used may be varied to a reasonable extent while still retaining many of the advantageous features of the invention.

What I claim as my invention is:

1. A synthetic resin which is the reaction product of a polyhydric alcohol, a polybasic aromatic acid and a reaction complex resulting from heating at 290° to 320° C. a mixture of rubber, a resin, a drying oil and an unsaturated fatty acid.

2. A synthetic resin which is the reaction produce of a polyhydric alcohol, a polybasic aromatic acid and a reaction complex resulting from heating at 290° to 320° C. a mixture of rubber, a resin, a drying oil, a saturated non-drying fatty acid and an unsaturated fatty acid.

3. A thermoplastic synthetic resin which is the reaction product of a polyhydric alcohol, a polybasic aromatic acid and a reaction complex resulting from heating at 290° to 320° C. a mixture of rubber, rosin, tung oil and linseed fatty acids.

4. A synthetic resin which is the reaction product of a polyhydric alcohol, a polybasic aromatic acid and a reaction complex resulting from heating at 290° to 320° C. a mixture of rubber, rosin, tung oil, a non-drying fatty acid of the $C_nH_{2n}O_2$ series.

5. A synthetic resin which is the reaction product of a polyhydric alcohol, a polybasic aromatic acid and a reaction complex resulting from heating at 290° to 320° C. a mixture of rubber, rosin, tung oil, a fatty acid of the oleic $C_nH_{2n-1}O_2$ series and linseed fatty acids.

6. A synthetic resin which is the reaction product of glycerol, phthalic anhydrid and a reaction complex resulting from heating at 290° to 320° C. a mixture of rubber, a resin, a drying oil and an unsaturated fatty acid.

7. A synthetic resin which is the reaction product of glycerol, phthalic anhydrid and a reaction complex resulting from heating at 290° to 320° C. a mixture of rubber, rosin, a drying oil, a saturated fatty acid and an unsaturated fatty acid.

8. A composition of matter comprising the reaction product of rubber, rosin, a fatty acid and a drying oil heated to 290° to 320° C., said product being a dark brown viscous mass possessing a characteristic pungent odor and having properties of the following order:

Specific gravity_____ 1.019
Saponification value_____ 126
Acid value_____ 88
Iodine number (Hanus)_____ 59 and no bromide value.

9. The reaction product obtained by heating at 290° to 320° C. a mixture in substantially the following proportions by weight linseed oil acids 32%, tung oil 14%, rosin 36%, oleic acid 9% and rubber 9%, said product being a dark brown viscous mass possessing a characteristic pungent odor and having properties of the following order:

Specific gravity_____ 1.019
Saponification value_____ 126
Acid value_____ 88
Iodine number (Hanus)_____ 59 and no bromide value.

10. A synthetic resin comprising a reaction product resulting from heating at a temperature approximately 220° C. 700 parts phthalic anhydrid, 451 parts glycerol and 1000 parts of a reaction complex, said reaction complex resulting from heating at 290° to 320° C. a mixture of rubber 9%, oleic acid 9%, tung oil 14%, rosin 36%, linseed acids 32%, said synthetic resin being a tough elastic mass, insoluble in gasoline and mineral spirits and very slowly soluble in toluol.

11. A synthetic resin in the form of tan-colored opaque solution comprising phthalic anhydrid, glycerol and a reaction product of rubber, rosin, a fatty acid and a drying oil heated to 290° to 320° C., said product being a dark brown viscous mass possessing a characteristic pungent odor and having properties of the following order:

| | |
|---|---|
| Specific gravity | 1.019 |
| Saponification value | 126 |
| Acid value | 88 |
| Iodine number (Hanus) | 59 | and no bromide value.

JOHN H. KELLY, Jr.